United States Patent [19]
Seamans et al.

[11] Patent Number: 5,990,037
[45] Date of Patent: Nov. 23, 1999

[54] METHOD OF TREATING SPONTANEOUSLY COMBUSTIBLE CATALYSTS

[75] Inventors: James Dallas Seamans, The Woodlands; John Alexander Partin, Spring; Edward Roy Samonte, The Woodlands, all of Tex.

[73] Assignee: CRI International, Inc., Houston, Tex.

[21] Appl. No.: 08/896,705

[22] Filed: Jul. 18, 1997

Related U.S. Application Data

[63] Continuation of application No. 08/431,391, Apr. 28, 1995, abandoned, which is a continuation of application No. 08/057,596, May 4, 1993, abandoned.

[51] Int. Cl.$^6$ .......................... B01J 27/02; B01J 27/047; B01J 27/043; B01J 27/045
[52] U.S. Cl. .............. 502/216; 502/28; 502/30; 502/31; 502/33; 502/168; 502/150; 502/172 502/219; 502/220; 502/222; 502/223; 208/113
[58] Field of Search .................... 502/28, 30, 31, 502/33, 150, 168, 216, 219, 220, 222, 223, 172; 208/113

[56] References Cited

U.S. PATENT DOCUMENTS

| | | | |
|---|---|---|---|
| 3,563,912 | 2/1971 | Young | 252/430 |
| 4,089,930 | 5/1978 | Kittrell et al. | 423/239 |
| 4,177,136 | 12/1979 | Herrington et al. | 208/215 |
| 4,234,462 | 11/1980 | Bondar et al. | 252/463 |
| 4,260,524 | 4/1981 | Yamada et al. | 252/463 |
| 4,520,128 | 5/1985 | Morales et al. | 502/210 |
| 4,530,911 | 7/1985 | Ryan et al. | 502/74 |
| 4,530,917 | 7/1985 | Berrebi | 502/220 |
| 4,794,098 | 12/1988 | Pohl et al. | 502/33 |
| 4,808,562 | 2/1989 | Kubersky et al. | 502/172 |
| 4,912,071 | 3/1990 | Kaijima et al. | 502/26 |
| 4,943,547 | 7/1990 | Seamans et al. | 502/150 |
| 4,999,326 | 3/1991 | Sikkenga et al. | 502/33 |
| 5,032,565 | 7/1991 | Berrebi | 502/331 |
| 5,041,404 | 8/1991 | Seamans et al. | 502/33 |
| 5,139,983 | 8/1992 | Berrebi et al. | 502/33 |
| 5,153,163 | 10/1992 | Roumieu et al. | 502/222 |
| 5,169,819 | 12/1992 | Berrebi | 502/168 |
| 5,397,756 | 3/1995 | Dufresne et al. | 502/33 |
| 5,681,787 | 10/1997 | Seamans et al. | 502/33 |

FOREIGN PATENT DOCUMENTS

| | | |
|---|---|---|
| 1555015 | 1/1969 | France . |
| 8900914 | 4/1989 | Netherlands . |
| 2208357 | 3/1989 | United Kingdom . |
| 2246083 | 1/1992 | United Kingdom . |
| WO 93/02793 | 2/1993 | WIPO . |

*Primary Examiner*—Elizabeth D Wood

[57] ABSTRACT

Self-heating characteristics of a spontaneously combustible catalyst are reduced by treating spontaneously combustible catalysts with oxygen-containing hydrocarbons having at least 12 carbon atoms. The treatment is particularly suitable for reducing the self-heating characteristics of sulfidable metal oxide(s)-containing catalysts, presulfurized catalysts, presulfided catalysts or reduced catalysts. When applied to sulfur-containing catalysts, the treatment gives a catalyst that has suppressed self-heating properties without substantially compromising sulfur retention or activity. Further, a method of safely unloading a catalyst from a reactor is provided where the catalyst in the reactor is treated with a liquid mixture containing oxygen-containing hydrocarbon having at least 12 carbon atoms to wet the catalyst.

30 Claims, No Drawings

METHOD OF TREATING SPONTANEOUSLY COMBUSTIBLE CATALYSTS

This is a continuation of application Ser. No. 08/431,391, filed Apr. 28, 1995, now abandoned, which is a continuation of Ser. No. 08/057,596, filed May 4, 1993, now abandoned.

FIELD OF THE INVENTION

This invention relates to a method of treating spontaneously combustible catalysts and catalyst compositions resulting from such treatment. In one aspect, the invention relates to a process for preparing catalysts that produces catalyst compositions with reduced self-heating characteristics.

BACKGROUND OF THE INVENTION

A spontaneously combustible catalyst may be defined as any catalyst composition which has a tendency to self-heat or combust in the presence of air or oxygen at a temperature of 200° C. or lower. Particularly many hydrocarbon processing catalysts, such as hydrotreating, hydrocracking and tail-gas treating catalysts which typically contain sulfur and reduced catalysts such as hydrogenation catalysts can be classified as spontaneously combustible catalysts. Some of the hydrocarbon processing catalysts can also be a reduced catalyst.

A hydrotreating catalyst may be defined as any catalyst composition which may be employed to catalyze the hydrogenation of hydrocarbon feedstocks, and most particularly to hydrogenate particular components of the feed stock, such as sulfur-, nitrogen- and metals-containing organo-compounds and unsaturates. A hydrocracking catalyst may be defined as any catalyst composition which may be employed to crack large and complex petroleum derived molecules to attain smaller molecules with the concomitant addition of hydrogen to the molecules. A tail gas catalyst may be defined as any catalyst which may be employed to catalyze the conversion of hazardous effluent gas streams to less harmful products, and most particularly to convert oxides of sulfur to hydrogen sulfide which can be recovered and readily converted to elemental sulfur. A reduced catalyst may be defined as any catalyst that contains a metal in the reduced state such as an olefin hydrogenation catalyst. Such metals are typically reduced with a reducing agent such as, for example, hydrogen or formic acid. The metals on these reduced catalyst may be fully reduced or partially reduced.

Catalyst compositions for hydrogenation catalysts are well known and several are commercially available. Typically, the active phase of the catalyst is base on at least one metal of group VIII, VIB, IVB, IIB or IB of the periodic table. In general, the hydrogenation catalysts contains at least one element selected from Pt, Pd, Ru, Ir, Rh, Os, Fe, Co, Ni, Cu, Mo, W, Ti Hg, Ag or Au supported usually on a support such as alumina, silica, silica-alumina and carbon. Such reduced catalysts can be classified as spontaneously combustible substances.

Catalyst compositions for hydrotreating and/or hydrocracking or tail gas treating are well known and several are commercially available. Metal oxide catalysts which come within this definition include cobalt-molybdenum, nickel-tungsten, and nickel-molybdenum supported usually on alumina, silica and silica-alumina, including zeolite, carriers. Also, other transition metal element catalysts may be employed for these purposes. In general, catalysts containing at least one element selected from V, Cr, Mn, Re, Co, Ni, Cu, Zn, Mo, W, Rh, Ru, Os, Ir, Pd, Pt, Ag, Au, Cd, Sn, Sb, Bi and Te have been disclosed as suitable for these purposes.

For maximum effectiveness the metal oxide catalysts are converted at least in part to metal sulfides. The metal oxide catalysts can be sulfided in the reactor by contact at elevated temperatures with hydrogen sulfide or a sulfur-containing oil or feed stock ("in-situ").

However, it is advantageous to the user to be supplied with metal oxide catalysts having sulfur, as an element or in the form of an organo-sulfur compound, incorporated therein. These presulfurized catalysts can be loaded into a reactor and brought up to reaction conditions in the presence of hydrogen causing the sulfur or sulfur compound to react with hydrogen and the metal oxides thereby converting them into sulfides without any additional process steps being needed. These presulfurized catalysts provide an economic advantage to the plant operator and avoid many of the hazards such as flammability and toxicity, which the plant operator encounter when using hydrogen sulfide, liquid sulfides, polysulfides and/or mercaptans to sulfide the catalysts.

Several methods of presulfurizing metal oxide catalysts are known. Hydrotreating catalysts have been presulfurized by incorporating sulfur compounds into a porous catalyst prior to hydrotreating a hydrocarbon feedstock. For example, U.S. Pat. No. 4,530,917 discloses a method of presulfurizing a hydrotreating catalyst with organic polysulfides. U.S. Pat. No. 4,177,136 discloses a method of presulfurizing a catalyst by treating the catalyst with elemental sulfur. Hydrogen is then used as a reducing agent to convert the elemental sulfur to hydrogen sulfide in situ. U.S. Pat. No. 4,089,930 discloses the pretreatment of a catalyst with elemental sulfur in the presence of hydrogen. U.S. Pat. No. 4,943,547 discloses a method of presulfurizing a hydrotreating catalyst by subliming elemental sulfur into the pores of the catalyst then heating the sulfur-catalyst mixture to a temperature above the melting point of sulfur in the presence of hydrogen. The catalyst is activated with hydrogen. PCT specification WO93/02793 discloses a method of presulfurizing a catalyst where elemental sulfur is incorporated in a porous catalyst and at the same time or subsequently treating the catalyst with a liquid olefinic hydrocarbon.

However, these ex-situ presulfurized catalysts must be transported to the user or plant operator. In transportation or shipping, these presulfurized catalysts are classified as spontaneously combustible substances which are further classified into two sub-groups of material, pyrophoric substances or self-heating substances. Both groups have the same basic properties of self-heating which may lead to spontaneous combustion, but differ in the degree of spontaneous combustion. Pyrophoric substances ignite, even in small quantities, within five minutes of coming into contact with air whereas self-heating substances ignite in air only when in large quantities and after long periods of time. Pyrophoric substances are typically classified as Division 4.2 Packing Group I and self-heating substances are classified in either Packing Group II or Packing Group III according to the test procedures recommended in the Dangerous Goods Special Bulletin, April 1987, published by TDG Ottawa, Transport Canada for Class 4, Division 4.2. These spontaneously combustible substances must be packaged in an United Nations (UN) designated 250 kg metal drum or in a smaller package of 100 kg plastic fiber drum or even smaller.

It is desirable to transport these presulfurized catalysts in larger quantities such as in flow bins or super sacks for economic reasons and ease of handling. But, in order to transport such catalysts in such larger quantities safely, they must pass the test for spontaneously combustible substances.

Further, some of the prior art ex-situ methods of presulfurizing supported metal oxide catalysts have suffered from excessive stripping of sulfur upon start-up of a hydrotreating reactor in the presence of a hydrocarbon feedstock. As a result of sulfur stripping, a decrease in catalyst activity or stability is observed. Further, the stripping of sulfur can cause fouling of downstream equipment.

Therefore, it is an object of the present invention to treat spontaneously combustible catalysts in a manner to suppress the self-heating properties of the catalysts. It is another object of the present invention to prepare an air and/or oxygen stable, presulfurized or presulfided catalyst, either fresh or regenerated with minimal stripping of sulfur and/or decrease in catalyst activity.

SUMMARY OF THE INVENTION

The present invention provides a composition comprising a spontaneously combustible catalyst having at least a portion of said spontaneously combustible catalyst coated with a substance comprising at least one oxygen-containing hydrocarbon having at least 12 carbon atoms by contacting the spontaneously combustible catalyst with an oxygen-containing hydrocarbon having at least 12 carbon atoms at a temperature of at least 0° C. Such composition has a reduced self-heating characteristic when compared to the spontaneously combustible catalyst which has not been coated.

Further, the present invention relates to an improved method of presulfurizing a sulfidable metal oxide(s)-containing catalyst which suppresses self-heating characteristics of the catalysts. According to the invention, there is provided a method of presulfurizing porous particles of a sulfidable catalyst containing at least one metal or metal oxide, which comprises:

(a) contacting said catalyst with elemental sulfur, a sulfur compound or a mixture thereof at a temperature such that at least a portion of said sulfur or sulfur compound is incorporated in the pores of said catalyst by impregnation, sublimation and/or melting; and (b) prior to, at the same time or subsequently contacting said catalyst particles in the presence of an oxygen-containing hydrocarbon having at least 12 carbon atoms.

The method is particularly suitable for application to hydrotreating and/or hydrocracking or tail gas treating catalysts.

Further more, the present invention provides a method of unloading a catalyst during a halt in the operation of the reactor wherein the catalyst in the reactor is contacted with a mixture comprising an oxygen-containing hydrocarbon having at least 12 carbon atoms prior to unloading.

DETAILED DESCRIPTION OF THE INVENTION

It has been found that by treating a spontaneously combustible catalyst by contacting with an oxygen-containing hydrocarbon having at least 12 carbon atoms, preferably at least 16 carbon atoms, more preferably at least 20 carbon atoms, the resulting catalyst has suppressed self-heating characteristics when compared to the spontaneously combustible catalyst without the treatment. In general, the inventive process suppresses the self-heating properties of the catalysts so they are no longer classified as spontaneously combustible substances. Thus, the inventive process allows the spontaneously combustible catalysts to be transported or shipped in any suitable packaging such as flow-bins, super-sacks, or sling-bins for example.

For the purpose of definition, "spontaneously combustible catalyst(s)" is any heterogeneous or solid metal(s)-metal oxide(s)-, metal sulfide(s)- or other metal compound(s)-containing catalyst which may or may not be on a support and can be classified as spontaneously combustible substances according to the test procedures recommended in the Dangerous Goods Special Bulletin, April 1987, published by TDG Ottawa, Transport Canada for Class 4, Division 4.2 or has a onset of exotherm below 200° C. as measured by the self-heating ramp test described below in the Illustrative Embodiments. The terms "metal(s)-", "metal oxide(s)-" and "metal sulfide(s)-" containing catalysts include catalyst precursors that are used as actual catalysts after further treatment or activation. Further, the term "metal(s)" includes metal(s) in partially oxidized form. The term "metal oxide(s)" includes metal oxide(s) in partially reduced form. The term "metal sulfide(s)" includes metal sulfide(s) that are partially sulfided as well as totally sulfided metals. The above terms include in part other components such as carbides, borides, nitrides, oxyhalides, alkoxides and alcoholates.

In one embodiment of the present invention, a spontaneously combustible catalyst is contacted with at least one oxo-organic composition, material, or substance (one or more oxygen-containing hydrocarbons) at a temperature of at least about 0° C., preferably at least about 15° C. to about 350° C., more preferably from about 20° C. to about 150° C. Upon contact, the oxygen-containing hydrocarbon is impregnated into the spontaneously combustible catalyst; the surface of the catalyst is coated with the oxygen-containing hydrocarbon. For the purpose of definition, the surface of the catalyst include the external surface of the catalyst as well as the internal pore surfaces of the catalyst. The word "coating" or "coated" does not rule out some reaction as defined below.

The mechanism by which the oxygen-containing hydrocarbon suppresses the self-heating characteristics or properties of the spontaneously combustible catalysts when contacted is not known and will be referenced herein as "reaction" or "reacts" for lack of better terminology. The suppressed self-heating result can be readily determined without undue experimentation by measuring the exothermic onset temperatures for a specific rising temperature profile of catalysts subjected to differing temperature/time treatments with the oxygen-containing hydrocarbon and without the oxygen-containing hydrocarbon. A suitable method for determining the exothermic onset temperatures of the catalysts is described in the Illustrative Embodiment below.

When applied to sulfur-containing catalysts such as sulfided, presulfurized or presulfidable metal or metal oxide catalysts, the treatment provides a catalyst with suppressed self-heating characteristics without substantially compromising sulfur retention or activity. The sulfided catalysts can be catalysts sulfided by an in-situ presulfiding method or an ex-situ presulfiding or presulfurizing method. The sulfided, presulfurized or presulfidable metal or metal oxide catalysts can be fresh or oxy-regenerated. For example, the oxygen-containing hydrocarbon can be coated on any of the sulfur-containing catalysts such as disclosed in U.S. Pat. Nos. 4,530,917; 4,177,136; 4,089,930; 5,153,163; 5,139,983; 5,169,819; 4,530,917; 4,943,547 and in PCT specification WO93/02793.

The oxygen-containing hydrocarbon can be coated on a reduced hydrogenation catalyst such as disclosed in U.S. Pat. No. 5,032,565.

In another embodiment of the present invention, a pre-sulfidable metal- or metal oxide-containing catalyst is contacted with an oxygen-containing hydrocarbon having at least 12 carbon atoms, prior to, at the same time or subsequent to presulfurizing the presulfidable metal or metal oxide catalysts at a temperature and for a time effective to cause the catalysts to exhibit suppressed self-heating properties compared to catalysts without treatment with the oxygen-containing hydrocarbon. Preferably the catalyst is heated after contacting with elemental sulfur or a sulfur compound at an elevated temperature and times sufficient to fix the sulfur onto the catalyst. Such heating process can be before or after treatment with the oxygen-containing hydrocarbon.

The mechanism by which the oxygen-containing hydrocarbon suppresses self-heating characteristics of the sulfur-incorporated catalyst when contacted is not known and will be referenced herein as "reaction" or "reacts" for lack of better terminology. The suppressed self-heating result can be readily determined without undue experimentation by measuring the exothermic onset temperatures in a manner described below.

Generally, the oxygen-containing hydrocarbon treated catalysts of the present invention also have enhanced resistance to sulfur stripping during startup in a hydrotreating and/or hydrocracking reactor in the presence of a hydrocarbon feedstock. The mechanism by which the contacting of the sulfur-incorporated catalyst becomes more resistant to sulfur stripping upon contact with the oxygen-containing hydrocarbons is also not known and will be referenced herein as "reaction" or "reacts". The enhanced resistance to sulfur stripping can readily be determined without undue experimentation by measuring the resistance to sulfur stripping of catalysts subjected to differing temperature/time treatments with the oxygen-containing hydrocarbon and without the oxygen-containing hydrocarbon and measuring the resistance to sulfur stripping of the resulting catalysts. A suitable method for determining sulfur stripping resistance is described in the Illustrative Embodiment below wherein toluene is used as a stripping agent.

Further, for elemental sulfur-incorporated catalysts, the percent retention of sulfur is improved by treating the catalyst with the oxygen-containing hydrocarbon, particularly for some high-pore volume catalysts. The mechanism by which the contacting of the elemental sulfur-incorporated catalyst improves sulfur retention upon contact with the oxygen-containing hydrocarbons is also not known and will be referenced herein as "reaction" or "reacts" for lack of better terminology. The improved sulfur retention can readily be determined without undue experimentation by measuring the percent sulfur retained compared with the theoretical amount as described in the Illustrative Embodiment below.

The catalysts referred to herein as "sulfidable metal oxide catalyst(s)" can be catalyst precursors that are used as actual catalysts while in the sulfided form and not in the oxide form. While reference is made to metal oxide catalyst(s), it is understood that while the normal catalyst preparative techniques will produce metal oxide(s), it is possible to utilize special preparative techniques to produce the catalytic metals in a reduced form, such as the zero valent state. Since metals in the zero valent state will be sulfided as well as the oxides when subjected to sulfiding conditions, catalysts containing such sulfidable metals even in reduced or zero valent states will be considered for the purposes of this invention as sulfidable metal oxide catalyst(s). Further, since the preparative technique of the instant invention can be applied to regenerated catalysts which may have the metal sulfide not completely converted to the oxides, "sulfidable metal oxide catalyst(s)" also refers to these catalysts which have part of their metals in the sulfided state.

There are three general methods used to carry out the process of this embodiment of the instant invention although other more or less equivalent methods will occur to one skilled in the art and are intended to be included within the scope of the invention.

In the first method of the present embodiment porous catalyst particles are contacted with elemental sulfur or sulfur compounds or mixtures thereof under conditions which cause the sulfur or sulfur compounds to be incorporated into the pores of the catalyst by impregnation, by sublimation, by melting or by a combination thereof. The elemental sulfur-incorporated or sulfur compound-incorporated catalysts will be referred to as "sulfur-incorporated catalysts."

The sulfur-incorporated catalyst particles are contacted with an oxygen-containing hydrocarbon having at least 12 carbon atoms at temperatures and times sufficient to cause the sulfur-incorporated catalyst particles to exhibit suppressed self-heating properties compared to catalysts without treatment with oxygen-containing hydrocarbons.

When elemental sulfur is used as the source of sulfur for the metal or metal oxide, at least one porous sulfidable metal oxide-containing catalyst is contacted with elemental sulfur at a temperature such that the elemental sulfur is substantially incorporated in the pores of the catalyst by sublimation and/or melting. When the porous catalyst particle is contacted with elemental sulfur, the temperature should be such that the sulfur is incorporated into the catalyst by sublimation and/or melting. While the catalyst particles can be contacted with sulfur in the molten state, it is preferred to first admix the catalyst particles with powdered elemental sulfur and then heat the mixture to above the temperature at which sublimation of the sulfur occurs.

Generally the catalyst particles are heated in the presence of the powdered elemental sulfur at a temperature greater than about 80° C. Typically the catalyst and powdered sulfur are placed in a vibratory or rotary mixer and heated to the desired temperature for sufficient time to allow the sulfur to be incorporated into the pores of the catalyst. Times typically will range from about 0.1 hour to about 10 hours or longer.

Preferably the sulfur impregnation step will be carried out at a temperature ranging from about 90° C. to about 130° C. or higher, up to the boiling point of sulfur of about 445° C. The lower temperature limit is fixed by the sublimation/melting characteristics of sulfur under the specific conditions of impregnation, whereas the upper temperature limit is fixed primarily by economics, higher temperatures being more costly to produce as well as more difficult to work with.

The sulfur-incorporated catalyst is then treated with the oxygen-containing hydrocarbon. The catalyst is preferably contacted at a temperature above about 0° C., preferably at a temperature within the range of from about 15° C. to about 350° C., more preferably from about 20° C. to about 150° C. When the oxygen-containing hydrocarbon is liquid or semi-fluid at ambient temperature, it is preferred to contact the oxygen-containing hydrocarbon at ambient temperature for ease of handling. If the oxygen-containing hydrocarbon is solid or semi-solid at ambient temperature or room temperature, the oxygen-containing hydrocarbon should be contacted with the catalyst at a temperature where the solid or semi-solid compound becomes liquid or semi-fluid to enable the oxygen-containing hydrocarbon to coat and/or impregnate the catalyst. For the treated catalyst to flow freely for convenience of handling, the amount of oxygen-containing catalyst contacted is preferably less than 100 percent, preferably form about 50 percent to 95 percent, more preferably 70 to 90 percent of the remaining pore volume after sulfur incorporation, although greater than 100 percent of oxygen-containing hydrocarbon can be used.

The sulfur-incorporated catalyst may be further heated before and/or after the oxygen-containing hydrocarbon treatment at a temperature greater than about 150° C., preferably at a temperature within the range of from about 175° C. to about 350° C. and more preferably from about 200° C. to about 325° C. to fix the incorporated-sulfur onto the catalyst.

Preferred sulfur compounds includes for example, ammonium sulfide, organic mono-, di- and poly-sulfides, dialkyl sulfoxides and any compounds derived from these compounds upon heating or reduction treatment in the presence of the sulfidable metal oxide and mixtures thereof. Some examples of organic sulfides include, polysulfides of general formula R—S(n)—R' or HO—R—S(n)—R—OH wherein n is an integer from 3 to 20 and R and R' are independently organic radicals of 1 to 50 carbon atoms such as ditert dodecyl polysulfide and diethanol disulfide; mercapto alcohols such as 2-mercaptoethanol; alkylmercaptans such as n-butyl mercaptan; thioglycols such as dithiopropyleneglycol; dialkyl or diary sulfides such as di-n-butyl sulfides and diphenyl sulfides; dialkylsulfoxides such as dimethyl sulfoxide; and mixtures thereof.

When sulfur compounds are used as the source of sulfur for the metal or metal oxide, the sulfur compounds are typically impregnated with an aqueous or organic solution. The organic solution can be any hydrocarbon or non-hydrocarbons equivalent to light gasoline, hexanes or gasoline of white spirit type. Such impregnation method by sulfur compounds are known and described in U.S. Pat. Nos. 5,153,163; 5,139,983; 5,169,819; and 4,530,917. These sulfur-compound incorporated catalysts are typically reduced by hydrogen, or other organic reducing agents such as formic acid, methyl formate, ethyl formate, acetaldehyde and methyl alcohol for example. The sulfur compound-incorporated catalyst is treated with the oxygen-containing hydrocarbon before and/or after the reduction step at the conditions as described above for the elemental sulfur-incorporated catalyst.

In the second method, a porous sulfidable metal oxide-containing catalyst is contacted with a mixture of powdered elemental sulfur and/or a sulfur compound and an oxygen-containing hydrocarbon having at least 12 carbon atoms and preferably while heating the resultant mixture to a temperature above about 80° C.

In the second embodiment according to the present invention, the catalyst particles are contacted with both the elemental sulfur, preferably powdered, and/or at least one sulfur compound and the oxygen-containing hydrocarbon simultaneously. Other hydrocarbons such as olefins can be optionally added simultaneously. According to this method, a mixture of powdered elemental sulfur and/or sulfur compound and oxygen-containing hydrocarbon is first produced. When elemental sulfur is used as the source of sulfur, a ratio of hydrocarbon to sulfur by weight ranging from about 1:2 to about 30:1 is suitable, with about 1:1 to about 6:1 being a preferred ratio. The mixture may be heated to promote homogenous mixing of the components, particularly if the oxygen-containing hydrocarbon is not liquid at ambient conditions or the mixture may be a suspension. Toluene or other light weight hydrocarbon solvents may be added to decrease the viscosity of the mixture. Also, increased heat will achieve the same effect. When a sulfur compound is used as the source of sulfur, a ratio of hydrocarbon to sulfur compound by weight ranging from about 1:2 to about 30:1 is suitable. The mixture is then added to a preweighed catalyst sample and mixed. When a mixture of elemental sulfur and sulfur compound is used as the source of sulfur, a ratio of hydrocarbon to elemental sulfur and sulfur compound by weight ranging from about 1:2 to about 30:1 is suitable.

When, elemental sulfur is used or a mixture containing elemental sulfur (can include sulfur compounds) is used, the mixture is then heated to incorporate sulfur at a temperature of above about 80° C. The times and temperature are the same as in the above described two-step first embodiment described above, that is from about 0.1 to about 10 hours or longer. When sulfur compounds are used, the catalyst is subjected to reducing conditions as above for the first embodiment of the invention.

In the third method, a porous sulfidable metal oxide-containing catalyst is first contacted with an oxygen-containing hydrocarbon having at least 12 carbon atoms before the presulfurization step. The resultant mixture can be optionally heated to a temperature above about room temperature (i.e. about 25° C.) for a solid or semi-solid hydrocarbon to allow the oxygen-containing hydrocarbon to impregnate the catalyst. The catalyst and/or oxygen-containing hydrocarbon is preferably heated to at least a temperature where the oxygen-containing hydrocarbon becomes liquid (e.g. at melting point) or semi-fluid. The oxygen-containing hydrocarbon treated catalyst is then presulfurized by contacting the oxygen-containing hydrocarbon-incorporated catalyst with elemental sulfur and/or sulfur compounds under conditions which cause the sulfur or sulfur compounds to be incorporated into the pores of the catalyst by impregnation, by sublimation, by melting or by a combination thereof as described in the first method of this embodiment. Optionally, the hydrocarbon-treated presulfurized catalyst can be heated during the sulfurization step or after impregnation of sulfur compounds regardless of prior heat-treatment. For the process of this invention, the catalyst should preferably be heated at some point after contacting with the sulfur at a temperature above about 150° C. for a time sufficient to fix the sulfur on the catalyst.

The catalyst is preferably treated with the oxygen-containing hydrocarbon after sulfur and/or sulfur compound incorporation for superior suppression of self-heating characteristics. If the sulfur and/or sulfur compound and the oxygen-containing hydrocarbon are contacted with the metal or metal oxide(s) catalyst simultaneously, it is preferable that the catalyst is contacted in such a manner which allows the sulfur and/or sulfur compounds to be incorporated or impregnated into the pores of the catalyst prior to the catalyst reacting or being coated with the oxygen-containing hydrocarbon at a temperature of above 80° C.

In any of the above methods of the present embodiment, the amounts of sulfur or sulfur compounds used in the instant process will depend upon the amounts of catalytic metal present in the catalyst that needs to be converted to the sulfide. Typically the amount of sulfur or sulfur compound used is determined on the basis of the stoichiometric amount of sulfur or sulfur compounds required to convert all of the metal on the catalyst to the sulfide form. For example a catalyst containing molybdenum would require two moles of sulfur or mono-sulfur compounds to convert each mole of molybdenum to molybdenum disulfide, with similar determinations being made for other metals. On regenerated catalysts, existing sulfur levels may be factored into the calculations for the amounts of elemental sulfur required.

It has been found that the addition of presulfurizing sulfur (elemental sulfur or sulfur compounds) in amounts down to about 50 percent of the stoichiometric requirement results in catalysts having enhanced hydrodenitrification activity, which is an important property of hydrotreating and first stage hydrocracking catalysts. Thus, the amount of presulfurizing sulfur used for incorporation into the catalyst will typically range from about 0.2 to about 1.5 times the stoichiometric amount, and preferably from about 0.4 to about 1.2 times the stoichiometric amount.

For hydrotreating/hydrocracking and tail gas treating catalysts containing Group VIB and/or Group VIII metals the amount of presulfurizing sulfur employed is typically about 2% to about 15% by weight of the catalyst charged, and most preferably, the amount of presulfurizing sulfur employed is about 6% to about 12% by weight of the catalyst charged. It is preferred not to add so much sulfur or sulfur compounds to the catalyst that the pores are completely filled up. By leaving residual pore volume, the oxygen-containing hydrocarbons can penetrate the pores and react therein.

The key step to the instant invention is to contact the catalyst with an oxygen-containing hydrocarbon having at least 12 carbon atoms for a sufficient time such that the hydrocarbon impregnates (or reacts) with the catalyst and provides a sulfurized catalyst that is less spontaneously combustible and is more resistant to sulfur leaching than one not contacted with an oxygen-containing hydrocarbon. Typically the contact temperature is greater than about 0° C. and typically will range from about 15° C. to about 350° C., preferably from about 20° C. to about 150° C. The contact temperature will vary depending on the melting point or sublimation temperature of the oxygen-containing hydrocarbon. For example, when the oxygen-containing hydrocarbon is a solid or a semi-solid such as lard, the oxygen-containing hydrocarbon process temperature should preferably be at least at a temperature of the melting point of the solid or semi-solid for a time sufficient for the catalyst to flow freely (appear "dry" and not stick or clump). In a specific example of lard as the oxygen-containing hydrocarbon, the lard is preferably contacted at a initial temperature of about 80° C. The process temperature for contacting the oxygen-containing hydrocarbon and catalyst can be readily determined by the melting point of the solid or semi-solid at a given pressure environment or visually by checking if the oxygen-containing hydrocarbon flows. Contact times will depend on temperature and the viscosity of the oxygen-containing hydrocarbon, higher temperatures requiring shorter times and higher viscosity requiring longer times. In general times will range from about 2 minutes to about 2 hours, although longer contact times can also be used.

Preferably the oxygen-containing hydrocarbon is sufficiently flowable or sublimable to give a sufficient contact with the metal oxide catalyst. An oxygen-containing hydrocarbon which is liquid at the elevated temperature of contact is more preferred for ease of handling. It is preferred that the oxygen-containing hydrocarbon is a higher hydrocarbon, i.e., one having a carbon number greater than twelve, preferably greater than sixteen, more preferably greater than twenty. The upper carbon number of useful oxygen-containing hydrocarbon is determined by the melting point, solidification point, or smoke point of the oxygen-containing hydrocarbon in question. While solid fatty oxygen-containing hydrocarbon having carbon numbers greater than 100 can be used, they are inconvenient since they must be heated to such a high temperature in order to be converted into a liquid, although they can be used with a solvent to put them in liquid form. Oxygen-containing hydrocarbons with carbon numbers within the range from about 12 to about 100, preferably from about 16 to about 80 are found most useful.

The term "oxygen-containing hydrocarbon" as used herein refers to hydrocarbon molecules containing at least one oxygen atom, which includes, for example, acids, acid esters, alcohols, aldehydes, ketones and ethers. The oxygen-containing hydrocarbon may be mixtures such as acid esters and alcohols, different acid esters and the like. The oxygen-containing hydrocarbon can be primary, secondary or tertiary. The hydrocarbon moiety can be straight or branched chain carbon atom linkages, cyclic, acyclic or aromatic. The hydrocarbon moiety can further be saturated or unsaturated. Preferably, the hydrocarbon moiety contains at least some unsaturation for superior activity when applied to hydrotreating, hydrocracking or tail gas treating catalyst. The term "unsaturated" as used herein refers to hydrocarbon molecules containing at least one carbon—carbon double bond in a molecule or compound(s) containing some carbon—carbon double bond and will have an iodine value of above 60 measured by standard iodine measuring techniques such as American Oil Chemist Society (AOCS) Official Method Cd 1-25 or IUPAC Method 2.205 described in International Union of Pure and Applied Chemistry, 7th ed., Blackwell Scientific Publications 1987 or any other standard iodine measuring techniques. The term "saturated" as used herein refers to oxygen-containing hydrocarbon compounds containing no carbon—carbon double bonds or compound(s) containing minimal carbon—carbon double bonds and have a iodine value of less than 60 measured by AOCS Official Method Cd 1-25, IUPAC Method 2.205 or any other standard iodine measuring techniques.

Preferably oxygen-containing hydrocarbons include, for example, higher alcohols having at least 12, preferably 16, more preferably 20 carbon atoms such as dodecanol, hexadecanol, farnesol, hexestrol, oleyl alcohol, cetyl alcohol, hexacosanol, triacontanol, cocceryl alcohol and octacosanol; higher ethers having at least 12, preferably 16, more preferably 20 carbon atoms such as dicetyl ether; higher ketones having at least 12 carbon atoms, preferably 16 carbon atoms, more preferably 20 carbon atoms such as palmitone, 10-hydroxypalmitone and 3-octadecanone; higher aldehydes having at least 12 carbon atoms, preferably 16, more preferably 20 carbon atoms such as palmitaldehyde and olealdehyde; higher acids having at least 12, preferably 16, more preferably 20 carbon atoms such as saturated acids such as lauric, myristic, palmitic, stearic, and docosanoic acids for example, or unsaturated higher acids such as palmitoleic, oleic, linoleic, linolenic, eleostearic, ricinoleic, eicosenoic, docosenoic, eicosatetraenoic, eicosapentaenoic, decosapentaenoic and docosahexaenoic; higher acid esters having at least 12, preferably 16, more preferably 20 carbon atoms including mono-, di-, tri- and poly-fatty acid esters including alkyl and aryl esters of the above acids (e.g. benzyl oleate and butyl oleate) and esters of the above acids with mono-glyceride, di-glycerides and triglycerides and mixtures thereof. These glyceride fatty acid esters having from 16 to 100, more preferably 18 to 90, most preferably 20 to 80 carbon atoms are preferred.

Some examples of commercial glyceride fatty acid esters include soybean oil, linseed oil, safflower oil, corn oil, sunflower oil, cottonseed oil, olive oil, tung oil, castor oil, rapeseed oil, tall oil, peanut oil, coconut oil, palm oil, canbra oil, perilla oil, lard, tallow, marine fat or oil such as fish fat or oil (e.g. herring and sardine), vegetable residues and mixtures thereof. Some examples of commercial higher alcohols includes alkanol mixtures such as NEODOL® alcohols from Shell Chemical Company, including mixtures of $C_9$, $C_{10}$ and $C_{11}$ alkanols (NEODOL® 91 Alcohol), mixtures of $C_{12}$ and $C_{13}$ alkanols (NEODOL® 23 Alcohol), mixtures of $C_{12}$, $C_{13}$, $C_{14}$ and $C_{15}$ alkanols (NEODOL® 25 Alcohol), and mixtures of $C_{14}$ and $C_{15}$ alkanols (NEODOL® 45 Alcohol); the ALFOL® Alcohols from Vista Chemical Company, including mixtures of $C_{10}$ and $C_{12}$ alkanols (ALFOL® 1012 Alcohol), mixtures of $C_{12}$ and $C_{14}$ alkanols (ALFOL® 1214 Alcohol), mixtures of $C_{16}$ and $C_{18}$ alkanols (ALFOL® 1618 Alcohol) and mixtures of $C_{16}$, $C_{18}$, and $C_{20}$ alkanols (ALFOL® 1620 Alcohol); the EPAL® Alcohols from Ethyl Chemical Company, including mixtures of $C_{10}$ and $C_{12}$ alkanols (EPAL® 1012 Alcohol), mixtures of $C_{12}$ and $C_{14}$ alkanols (EPAL® 1214 Alcohol) and mixtures of $C_{14}$, $C_{16}$, and $C_{18}$ alkanols (EPAL® 1418 Alcohol); and the TERGITOL-L® Alcohols from Union Carbide Corporation, including mixtures of $C_{12}$, $C_{13}$, $C_{14}$ and $C_{15}$ alkanols (TERGITOL-L® 125 Alcohols). Suitable commercially available alkanols prepared by the reduction of naturally occurring fatty acid esters includes for example, the CO and TA products of Procter and Gamble Company and the TA alcohols of Ashland Oil Company. Higher oligomers and polymers of polyols such as alkylene glycols are also suitable as higher alcohols.

Optionally, these oxygen-containing hydrocarbon treated catalyst can be further treated with or simultaneously treated with or treated prior to the hydrocarbon treatment with olefins to enhance catalytic activity in hydrocracking, hydrotreating or tail gas treating. The term "olefin" as used herein refers to hydrocarbons containing at least one carbon—carbon double bond. The olefins may be monoolefins or polyolefins, cyclic or acyclic, linear or branched. Non-limiting examples of monoolefins include decene, undecene, dodecene, tridecene, tetradecene, pentadecene, hexadecene, heptadecene, octadecene, nonadecene, eicosene, and the like, whether branched, linear or cyclic, alpha or internal olefin. Similar materials in the form of di-, tri- and polyolefins may be used. Polycyclic olefins and polyolefins may also be used. The readily available compound dicyclopentadiene is found useful. The oxygen-containing hydrocarbons may also be admixed with other hydrocarbons, such as alkanes or aromatic solvents.

In general, for superior activity of the catalyst upon start-up in the plant, the weight percent of the unsaturated compounds of any hydrocarbon used in the process (include unsaturated oxygen-containing hydrocarbon and olefins) of the instant invention should be above about 5% wt., preferably above about 10% wt., and most preferably above about 30% wt. Generally, a higher weight percent of unsaturation compounds is used, say, above about 50% wt, and most conveniently the weight percent of the unsaturated hydrocarbons is 100% wt (undiluted form and only unsaturated oxygen-containing hydrocarbon and/or olefins). For example, when the catalyst is treated with olefins and oxygen-containing hydrocarbons, the unsaturation may be provided from olefin alone using saturated oxygen-containing hydrocarbons or from olefin and some unsaturated oxygen-containing hydrocarbon. Of course, unsaturated oxygen-containing hydrocarbon alone without olefins can be used for the inventive process. It is understood that the oxygen-containing hydrocarbons may be provided as oxygen-containing hydrocarbon precursors which are converted to the oxgyen-containing hydrocarbon before or upon reaching the reaction temperature such as, for example, reacting lower molecular weight aicds (e.g. lower than $C_{12}$ acids) with glycerol to form a higher triglyceride acid ester within the scope of the invention.

The minimum amounts of oxygen-containing hydrocarbons to be used should be such that upon contact with the catalyst, a catalyst is obtained that is less spontaneously combustible. The maximum amounts of oxygen-containing hydrocarbon used are determined primarily by economics. In a preferred embodiment the amount of substance or mixtures ("mixture(s)" can be a single compound or more than one compounds or components) containing the oxygen-containing hydrocarbon is used that will just fill the pore volume of the sulfur impregnated catalyst or just slightly less, down to about 50 percent, preferably down to about 70 percent of the pore volume. A preferred target range is from about 80 to about 95 percent of the pore volume. In this manner, the treated catalyst will be "dry" and is more convenient to handle.

The presulfurized catalysts obtained by the presulfurization processes of the above embodiment contain at least one presulfidable metal or metal oxide as defined above and elemental sulfur and/or a sulfur compound where the catalyst is coated with an oxygen-containing hydrocarbon having at least 12 carbon atoms.

The presulfurized catalyst obtained by the above presulfurization process may be converted to sulfided catalysts by contact with hydrogen at temperatures greater than about 200° C., preferably ranging from about 200° C. to about 425° C. Times can run from about 0.5 hours to up to 3 days.

In preferred operation the presulfurized catalyst of the instant invention is loaded into a hydrotreating and/or hydrocracking reactor or tail gas reactor and hydrogen flow is started to the reactor and the reactor is heated up to operating (hydrotreating and/or hydrocracking or tail gas treating) conditions. In the presence of hydrogen, activation of the catalyst takes place. That is, the metal oxides and hydrogen react with substantially all of the sulfur incorporated into the catalyst pores, thus producing hydrogen sulfide, water and metal sulfides. In the hydrotreating and/or hydrocracking process, a hydrocarbon feedstock flow may be started simultaneously with the hydrogen or later.

The process of the present invention is further applicable to the sulfurizing of spent catalysts which have been oxy-regenerated. After a conventional oxy-regeneration process, an oxy-regenerated catalyst may be presulfurized as would fresh catalyst in the manner set forth above and specifically in a manner set forth by way of the following examples.

The instant invention is also intended to encompass a method for stabilizing (less spontaneouly combustible or reducing the self-heating characteristics) a supported metal catalyst containing elemental sulfur, particularly a Group VIB and/or Group VIII metal catalyst, by contacting the catalyst with an oxygen-containing hydrocarbon at a temperature and time sufficient to impregnate and/or to react with the catalyst.

In applying the oxygen-containing hydrocarbon to the catalyst, the oxygen-containing hydrocarbon can be added in batches and mixed or added continuously by spraying the catalyst with the oxygen-containing hydrocarbon.

The inventive process is particularly suitable for application to hydrotreating and/or hydrocracking or tail gas treating catalysts. These catalysts typically comprise Group VIB and/or Group VIII metals supported on porous supports such as alumina, silica, silica-alumina, zeolite and the like. The materials are well defined in the art and can be prepared by techniques described therein, such as in U.S. Pat. No. 4,530,911, and U.S. Pat. No. 4,520,128, both incorporated by reference herein. Preferred hydrotreating and/or hydrocracking or tail gas treating catalysts will contain a group VIB metal selected from molybdenum, tungsten and mixtures thereof and a Group VIII metal selected from nickel, cobalt and mixtures thereof supported on alumina. Versatile hydrotreating and/or hydrocracking catalysts which show good activity under various reactor conditions are alumina-supported nickel-molybdenum and cobalt-molybdenum catalysts. Phosphorous is sometimes added as a promoter. A versatile tail gas treating catalyst which shows good activity under various reactor conditions is an alumina-supported cobalt-molybdenum catalyst.

Hydrotreating catalysts which are specifically designed for hydrodenitrification operations, such as alumina-supported nickel-molybdenum catalysts, presulfurized or presulfided by the methods described herein have equal activities, particularly hydrodenitrification activities, than catalysts without the oxygen-containing hydrocarbon treatment. The ability to avoid instantaneous combusting provides the instant presulfurized catalysts with a significant commercial advantage. The ex-situ presulfurization method of this invention allows the hydrotreating, hydrocracking and/or tail gas treating reactors to be started up more quickly compared with the in-situ operation by eliminating the presulfiding step. Further, the presulfurized catalysts of the invention have a more convenient way of handling the catalyst transported to the plant or reactor site than the conventional ex-situ presulfurized catalysts.

Thus, the instant invention relates to an improved process for starting up a hydrotreating and/or hydrocracking reactor, which comprises loading the catalyst presulfurized according to the methods described herein into the reactor and heating the reactor to operating conditions in the presence of hydrogen and optionally a hydrocarbon feedstock. The invention is also an improved hydrotreating and/or hydrocracking process which comprises contacting at hydrotreating and/or hydrocracking conditions a hydrocarbon feedstock and hydrogen with a catalyst which has been presulfurized according to the methods taught herein and which has been heated to hydrotreating and/or hydrocracking temperature in the presence of hydrogen and optionally a hydrocarbon feedstock.

Hydrotreating conditions comprise temperatures ranging from about 100° C. to about 425° C., pressures above about 40 atmospheres. The total pressure will typically range from about 400 to about 2500 psig. The hydrogen partial pressure will typically range from about 200 to about 2200 psig. The hydrogen feed rate will typically range from about 200 to about 10000 standard cubic feet per barrel ("SCF/BBL"). The feedstock rate will typically have a liquid hourly space velocity ("LHSV") ranging from 0.1 to about 15.

Hydrocracking conditions comprise temperatures ranging from about 300° C. to about 500° C., pressures above about 40 atmospheres. The total pressure will typically range from about 400 to about 3000 psig. The hydrogen partial pressure will typically range from about 300 to about 2600 psig. The hydrogen feed rate will typically range from about 1000 to about 10,000 standard cubic feet per barrel ("SCF/BBL"). The feedstock rate will typically have a liquid hourly space velocity ("LHSV") ranging from 0.1 to about 15. First stage hydrocrackers, which carry out considerable hydrotreating of the feedstock may operate at higher temperatures than hydrotreaters and at lower temperatures than second stage hydrocrackers.

Tail gas treatment reactors typically operate at temperatures ranging from about 200° C. to about 400° C. and at atmospheric pressure. About 0.5–5% vol. of the tail gas fed to the reactor will comprise hydrogen. Standard gaseous hourly space velocities of the tail gas through the reactor will range from about 500 to about 10,000 $hr^{-1}$. There are several ways the subject catalysts can be started up in a tail gas treatment reactor. Claus unit feed or tail gas can be used to start up the subject catalysts. Supplemental hydrogen, as required, may be provided by a gas burner operating at a substoichiometric ratio in order to produce hydrogen.

In another embodiment of the invention, catalysts in a refining or a chemical plant reactor such as, for example, hydrocracking, hydrotreating, tail gas treating, hydrogenation, dehydrogenation, isonarization and de-waxing can be contacted (treated) with the oxygen-containing hydrocarbons described above and optionally carrier oil including feed oil and/or fused-ring aromatic hydrocarbons before unloading from the reactor. The inventive process provides a method of safely unloading the catalysts with minimal catalyst oxidation and deterioration. The oxygen-containing hydrocarbon-containing mixture (mixture can be undiluted oxygen-containing hydrocarbon) penetrates to the surface of the catalyst and diffuses into the pores of the catalysts at the temperature in the reactor after suspension (or stopping) of its operation, and coats the catalyst with a film. The term "coats", "coating" and "coated" may be defined in a same manner as "coated" defined above. Typically the operation of the reactor is suspended, stopped or halted by terminating the refining or chemical reaction, for example by terminating the feed or by lower temperature.

It is preferred that the temperature within the reactor column be lower than the smoke point or boiling point (at the reactor operation pressure) of the oxygen-containing hydrocarbon when the mixture is added to the catalyst in the reactor. Thus, after the operation of the reactor is stopped, the feed and/or catalyst can be cooled from the operating temperature by allowing the reactor to equilibrate with the ambient temperature, recycling or by passing feed through a cooling unit. The feed to the reactor can optionally be shut off. For application of many of the oxygen-containing hydrocarbons, the temperature of the reactor and/or catalyst is preferably less than about 175° C., more preferably less than about 125° C. when the oxygen-containing hydrocarbon is contacted with the catalyst at atmospheric pressure. If the oxygen-containing hydrocarbon mixture is contacted with the catalyst at elevated reactor pressures, the reactor and/or catalyst temperatures can be higher. The contact temperature can be as low as the unloading temperature or lower. The catalyst is typically unloaded at a temperature within the range of about room temperature to about 70° C.

The oxygen-containing hydrocarbon mixture is introduced into a reactor column after suspension of reactor operation. The oxygen-containing hydrocarbon mixture can be added to a batch containing the catalysts or to a recycle stream. Optionally, heavy oil or any similar raw materials from the reactor columns can be removed before adding the oxygen-containing hydrocarbon. The catalyst is coated with the oxygen-containing hydrocarbon upon contact and incorporation, thus enhancing the safety of the unloading operation by protecting the catalyst against oxidation and rendering the catalyst less spontaneously combustible.

A mixture containing the oxygen-containing hydrocarbon preferably in an amount from about 1 weight percent to 100 weight percent of the mixture is contacted with the catalyst in the reactor for a time effective to coat the catalyst and reduce the self-heating characteristics of the catalyst. Preferably the mixture should be used in an amount sufficient to coat the surface of the catalyst.

The oxygen-containing hydrocarbon may be applied in admixture with fused-ring aromatic hydrocarbons and/or a carrier oil. Preferable fused-ring aromatic hydrocarbon includes for example, any fused-ring aromatic hydrocarbons containing at least 2 rings, preferably 2 to 4 rings. Examples of the fused-ring aromatic hydrocarbons includes naphthalenes such as alkylnaphthalene; anthracenes such as alkylanthracene; and pyrenes such as allylpyrene. Such fused-ring aromatic hydrocarbons may be unsubstituted or substituted for example with alkyl or aryl moieties. Carrier oil can be any hydrocarbon stream in refining operations or a blend thereof having a flash point of above about 38° C. Preferably carrier oil includes straight-run heavy gas oil (HGO), vacuum gas oil (VGO), diesel and the likes.

The oxygen-containing hydrocarbon and optionally fused-ring aromatic hydrocarbon and/or carrier oil can be added through separate lines then mixed or added after being mixed. If desired, the mixture can be heated with any heating means such as for example, heating furnace, band heater, heating coil or a heat exchanger to the desired temperature.

The ranges and limitations provided in the instant specification and claims are those which are believed to particularly point out and distinctly claim the instant invention. It is, however, understood that other ranges and limitations that perform substantially the same function in substantially the same way to obtain the same or substantially the same result are intended to be within the scope of the instant invention as defined by the instant specification and claims.

Illustrative Embodiments

The invention will be described by the following examples which are provided for illustrative purposes and are not to be construed as limiting the invention.

EXAMPLE I

This example demonstrates one of the embodiments of the invention where the catalysts are first presulfurized and then treated with oxygen-containing hydrocarbons. The onset temperatures of the exotherms of the catalysts of the invention are compared with comparative examples.

Part A: Sulfur impregnation

A commercial hydrotreating catalyst having the properties listed below was used to prepare the sulfurized catalysts.

TABLE 1

| Catalyst Properties | |
|---|---|
| Nickel | 3.0% wt |
| Molybdenum | 13.0% wt |
| Phosphorous | 3.5% wt |
| Support | gamma alumina |
| Surface Area, $m^2/g$ | 162 |
| Water Pore Vol., cc/g | 0.47 |
| Size | 1/16 inch trilobes |

Typically a 250 gram sample of the above sample was dried at 371° C. for one hour and then cooled to ambient under vacuum. The sample was then placed in a flask and enough sulfur, in powdered form, was added at 85° C. to produce a sulfur level of about 10% by weight. The sulfur was allowed to coat the catalyst then the flask, which was provided with a slow nitrogen purge and placed in a heating mantle, was further heated to 120° C. for 30 minutes. During this time period the flask was vibrated continually to provide mixing of sulfur and catalyst. The final sulfur level was about 10% by weight of the total catalyst. The water pore volume of the sulfur-impregnated catalyst was determined to be about 0.37 cc/g.

Part B: Oxygen-containing Hydrocarbon Reaction and Comparative Examples

The sulfur-impregnated catalyst from Part A was impregnated with the various oxygen-containing hydrocarbons listed in Table 2. Catalyst from Part A was also impregnated with Diesel and Neodene® 14/16/18 alpha-olefins as comparative examples. The catalyst was impregnated with hydrocarbons listed in Table 2 sufficient to fill 80% of the pore volume calculated by:

(pore volume of catalyst from Part A) (80%) (adjusted weight of catalyst)(density of oxygen-containing hydrocarbon or comparative compounds)=grams of oxygen-containing hydrocarbon or comparative compounds. The pore volume of the catalyst was determined with water (mL/g). Adjusted weight is the amount of sulfur/catalyst remaining after retains and pore volume analysis.

The lard, vegetable residue and coconut oil, being solids or semi-solids at room temperature, were heated up to approximately 80° C. before being applied to the catalyst. All other hydrocarbons were simply added to the catalyst at room temperature. The catalyst was shaken with the hydrocarbon until the catalyst appeared dry and is free flowing. This took approximately 10 minutes per sample. Once the hydrocarbon is absorbed the catalyst temperature was allowed to return to room temperature.

150 Grams of the hydrocarbon-containing catalyst were loaded into a 1 liter four-neck flask equipped with a thermocouple through one of the necks and placed in a heating mantle. Another neck of the flask was tubed to a another flask equipped with a condenser which was tubed to a silicone oil-filled container to prevent air back-diffusion (outlet). Nitrogen flow was established to the flask through another neck of the flask (inlet) at 273 cc/min. The remaining neck was stoppered. The flask attached to a vibratory table and vibrated for the duration of the heat treatment described below.

The reactor was heated to 260° C. over the course of ten to twenty minutes and held there typically for 30 minutes. After heat treatment was complete, the reactor contents were cooled to room temperature under nitrogen purge. The samples were analyzed for sulfur content and the exothermic onset temperatures of the samples were tested.

Part C: Self-Heating Ramp Test

Approximately a 12 gram aliquot of the test sample was placed in a 3.1 cm diameter, 4.6 cm height sample container. The sample container was made of 250 mesh stainless steel net. The sample container was covered with a 30 mesh stainless steel net container cover which had a square bottom net with the corners bent to form four legs as to raise the sample container 0.8 cm off platform.

The sample container was placed in a programmable furnace at ambient temperature with a stagnant atmosphere. A thermocouple is placed in the center of the sample. Another thermocouple is placed near the sample container to monitor oven temperature. The oven was ramped at 0.4° C./minute to 450° C. The temperature data was collected and plotted as described below.

A time-temperature profile was plotted with temperature in the Y-axis and time in the X-axis for catalyst temperature and oven temperature.

Exothermic onset temperatures of the temperature profile test were determined by drawing a 45 degree tangent on the sample's temperature trace at the onset of an exotherm. From the tangent point, a vertical line was drawn to the oven trace then from that point horizontal to the Y axis for temperature readings. The results of the self-heating ramp tests are shown in Table 2 below.

TABLE 2

Exothermic Onset Temperatures

| Oxygen-containing hydrocarbon | Onset of Exotherm (° C.) |
|---|---|
| Lard[a] | 262 |
| Vegetable Residue[b] | 250 |
| Distilled Methyl Esters[c] | 206 |
| Linoleic Acid[d] | 244 |
| Fatty alcohol[e] | 212 |
| Linseed Oil[f] | 273 |
| Soybean Oil[g] | 237 |
| Coconut Oil[h] | 200 |
| Comparative | |
| Diesel[i] | 156 |
| Neodene ® 14/16/18[j] | 158 |

[a] Lard from Armour Foods.
[b] A vegetable oil residue from Arista Industries, Inc. whose composition is a mixture of glycerides, polyglycerides, polyglycerols, dimer acids, hydrocarbon and alcohols comprising 79% wt $C_{18}$ fatty acids, and 17% wt $C_{16}$-fatty acids and having an iodine value of 95–110.
[c] Distilled methyl esters from Arista Industries, Inc. having 100% wt of composition of CAS Registry No. 68990-52-3.
[d] 99% purity linoleic Acid from Aldrich Chemical.
[e] Mixture of saturated and unsaturated alcohol from Henkel Corporation whose composition is 87–95% wt oleyl alcohol and 2–10% wt cetyl alcohol having 90–95 iodine value.
[f] Raw linseed oil from Anlor Oil Company.
[g] RBD soybean oil from Lou Ana Foods.
[h] Laxmi Brand distributed by House of Spices.
[i] No. 2 fuel oil with cetane value of 43 from Exxon Refining and Marketing Company.
[j] An olefin product manufactured by Shell Chemical Co. whose composition is 93.5% wt. minimum alpha-monoolefin comprising 15% wt. $C_{14}$ alpha-monoolefin, 50% wt. $C_{16}$ alpha-monoolefin and 35% wt. $C_{18}$ alpha-monoolefin.

Part D: Sulfur Leaching Tests

Toluene was used as a extractive solvent for measuring the ability of the catalysts to resist sulfur leaching. This method is applicable to solid materials such as heterogeneous catalysts. For testing other materials modifications to this procedure may be required before analysis. Generally, the samples are subjected to a hot toluene extraction over a period of time, then washed with petroleum ether and dried for analysis. Sulfur analyses before and following the extraction are used to calculate percent sulfur retention. A thorough drying of the sample is necessary to prevent artificially high carbon and sulfur readings during analysis.

A Soxhlet extractor (200 ml) equipped with a boiling flask (500 ml) and Allihn condenser was used in this test. The cotton thimble of the extractor was filled with approximately 10 grams of catalyst to be analyzed and loaded into the Soxhlet extractor. The boiling flask was filled about ¾ full (about 350 ml) with toluene. Toluene was brought to rapid boiling so a cycle of filling and emptying of thimble occurs approximately every 7–9 minutes. The catalyst sample was extracted for a minimum of 4 hours to a maximum of 18 hours. Extraction was stopped when extract in siphon tube was water clear. Catalyst was cooled and placed on a filter in Buchner funnel and washed with 50 mL of petroleum ether to displace toluene then dried in a 100° C. oven for 1 hour. Prolonged drying may compromise results by loss of sulfur from sample. An alternate drying method is to purge the sample with nitrogen for 2 to 3 hours. The extracted catalysts were analyzed for carbon and sulfur content (Carbon wt. % and Sulfur wt. % respectively) with a LECO corporation CS-244 carbon-sulfur analyzer. The percent of sulfur retained after extraction is shown in Table 3 below. This percent of retained sulfur is calculated as the amount of sulfur on the catalyst after the extraction of Part D (Fresh Basis after) divided by the sulfur in the catalyst after the oxygen-containing hydrocarbon treatment of Part B (Fresh Basis before) times 100%. Fresh basis was calculated using the following equation:

Fresh Basis Sulfur=Sulfur wt. %/(100-(Carbon wt. %+Sulfur wt. %))*100%.

TABLE 3

Sulfur Leaching Results
"Reactant" Hydrocarbon
Amount of Sulfur After Extraction

| Oxygen-containing hydrocarbon | Sulfur Extractability (%) |
|---|---|
| Lard [a] | >95 |
| Vegetable Residue [b] | 85 |
| Distilled Methyl Esters [c] | >95 |
| Linoleic Acid [d] | 86 |
| Fatty alcohol [e] | 66 |
| Linseed Oil [f] | 85 |
| Soybean Oil [g] | 88 |
| Coconut Oil [h] | 96 |
| Comparative | |
| Diesel [i] | 77 |
| Neodene ® 14/16/18 [j] | 95 |

[a]–[j] as described in Table 2.

Part E: Sulfur Retention Tests

A commercial hydrotreating catalyst having the properties listed below was used to prepare the sulfurized catalysts for this test:

TABLE 4

Catalyst Properties

| Nickel | 2.24% wt |
|---|---|
| Molybdenum | 7.54% wt |
| Phosphorous | 3.5% wt |
| Support | gamma alumina |
| Surface Area, $m^2$/g | 309 |
| Water Pore Vol., cc/g | 1 |
| Size | 1/16 inch trilobes |

Sulfur was impregnated according to the method of Part A using 5.9 wt % of sulfur and soybean oil and Neodene® 14/16/18 were impregnated according to the method of Part B. Carbon and sulfur content of the catalyst were analyzed using LECO corporation CS-244 carbon-sulfur analyzer. Fresh Basis Sulfur was calculated using the equation shown in Part D. Percent Stoichiometric sulfur was calculated by dividing (the Fresh Basis Sulfur) over (the amount of sulfur added) times 100 percent.

TABLE 5

Sulfur Retention

| Sample | Carbon wt. % | Sulfur wt. % | Fresh Basis Sulfur wt. % | Percent Stoichiometric |
|---|---|---|---|---|
| Neodene ®[a] | 26.7 | 3.0 | 4.3 | 73 |
| Soybean[b] | 33.5 | 3.5 | 5.6 | 95 |

[a] and [b] as described in Table 2 as [j] and [g] respectively.

As can be seen from the Table. the percent retention of sulfur is significantly improved by using a glyceride fatty acid ester.

EXAMPLE II

This example demonstrates the embodiment where the presulfided or sulfurized catalyst is coated with oxygen-containing hydrocarbons. This is a post-coating method. A commercial sulfurized hydrotreating catalyst having the properties listed below was used to prepare the sulfurized catalysts.

TABLE 6

Catalyst Properties

| | |
|---|---|
| Nickel | 3.0% wt |
| Molybdenum | 13.0% wt |
| Phosphorous | 3.5% wt |
| Sulfur | 8% wt |
| Support | gamma alumina |
| Size | 1/16 inch trilobes |

The oxygen-containing hydrocarbon listed in Table 7 below were added to the sulfurized catalyst in an amount listed in Table 7. The oxygen-containing hydrocarbon was added to the catalyst at ambient temperature and allowed to absorb into the pores. The treated catalyst may take some time to absorb the substances so that it is not tacky and flows freely. The self-heating ramp test was measured in a similar manner to Example I, part C.

TABLE 7

Post-coating

| Oxygen-containing Hydrocarbon | Amount (wt %) | Onset of Exotherm (° C.) |
|---|---|---|
| 1:1 wt ratio soybean:linseed | 8 | 280 |
| 1:3 wt ratio soybean:linseed | 10 | 260 |

EXAMPLE III

The presulfurized catalyst prepared according to the inventive method in a similar manner to Example I was used in a hydrotreating process.

7 types of catalysts, 1 comparative and 6 of this invention, were used to demonstrate the advantages of the instant invention as applied to a hydrotreating process. These were:

1) COMP Catalyst—This is the commercial hydrotreating catalyst listed in Table 1 which has been sulfided by an industry accepted sulfiding method using hydrogen and hydrogen sulfide as is described below.
2) A Catalyst—This is a catalyst prepared as described in Illustrative Embodiment I with 100% stoichiometric sulfur and using the lard described in Table 2 as the treating oxygen-containing hydrocarbon.
3) B Catalyst—This is a catalyst prepared as described in Illustrative Embodiment I with 100% stoichiometric sulfur and using the vegetable residue described in Table 2 as the treating oxygen-containing hydrocarbon.
4) C Catalyst—This is a catalyst prepared as described in Illustrative Embodiment I with 100% stoichiometric sulfur and using the coconut oil described in Table 2 as the treating oxygen-containing hydrocarbon.
5) D Catalyst—This is a catalyst prepared as described in Illustrative Embodiment I with 100% stoichiometric sulfur and using the methyl esters described in Table 2 as the treating oxygen-containing hydrocarbon.
6) E Catalyst—This is a catalyst prepared as described in Illustrative Embodiment I with 100% stoichiometric sulfur and using the vegetable oil described in Table 2 as the treating oxygen-containing hydrocarbon and Neodene® 14/16/18 alpha-olefin described in Table 2 in a weight ratio of 1:1.

The catalysts were loaded into the reactor as follows: 48 cc of catalyst (basis compacted bulk density) was divided into 3 aliquots. The first aliquot contained 4 cc of catalyst and was diluted with 10 to 14 mesh alundum at a ratio of alundum to catalyst of 10:1. The remaining two aliquots contained 22 cc of catalyst each and were diluted 1:1 with alundum. These aliquots were loaded into the reactor tube with the dilute one on top (the inlet end).

Activity Tests

A blend of 50 wt % vacuum gas oil, 25 wt % light cycle oil and 25 wt % CC heavy gas oil (VGO/LCO) was used as feedstock and had the following properties:

| | |
|---|---|
| % wt Sulfur | 1.93 |
| ppm Nitrogen | 1420 |
| Refractive Index | 1.5377 (25° C.) |
| API Gravity | 17.8° |

1) COMP Catalyst Activation

The COMP Catalyst was dried at 400° C. for one hour in air, cooled in a desiccator and loaded into the reactor. It was sulfided in a flow of 60 Nl/hr of 95% vol hydrogen/5% vol hydrogen sulfide according to the following schedule:

a. ambient to 218° C. in one hour
b. hold at 218° C. for one hour
c. heat from 218° C. to 329° C. in one hour
d. heat from 229° C. to 343° C. in one hour
e. hold at 343° C. for one hour
f. cool reactor and hold at 246° C.

2) Diesel Activation

This method was used to activate catalysts of this invention using a diesel refined for cars and trucks and was as follows:

a. Unit was pressurized to 700 psig and hydrogen circulation was established at 1000 SCF/BBL (Nl/hr).
b. Diesel feed was started to the catalyst bed at 1.5 LHSV and ambient temperature.
c. The reactor temperature was raised to 121° C. in one hour, then increased to 343° C. at rate of 27.8° C./hour. Temperatures were held at 343° C. for 30 minutes.
d. The reactor was then cooled over 2 hours to 246° C.

3) Activity Testing

For activity testing the unit was pressured up to 700 psig and heated to 246° C. with a hydrogen gas rate of 220 SCF/bbl (13.2 Nl/hr). The VGO/LCO feed was started to the unit at 1.5 LHSV (66 gm/hr). After the feed had wetted the entire bed (and product was noted in the separator), the temperature was raised to 329° C. at 22.2° C./hr.

After the reactor was at 329° C., a 12 hour break-in period was begun. The product from this period was not analyzed. The run was continued with additional weight periods of 12 hours and the products of third weight period (37–48 hours) were analyzed for nitrogen and sulfur. From these values rate constants were calculated for the hydrodenitrification ("HDN") reaction and the hydrodesulfurization ("HDS") reaction. Rate constants provide an indication of how active the catalyst is, the higher the rate constant, the faster the reaction process, and the higher the conversion of sulfur and nitrogen at a given space velocity (feed rate). For HDN the reaction order is 1.0 and the k value is calculated by the equation $$k = (\text{space velocity}) * \ln\left\{\frac{\text{conc. of } N \text{ in feed}}{\text{conc. of } N \text{ in product}}\right\}$$

For HDS the reaction is not first order and many values are used, but 1.7 is the value most used and is used herein to calculate as follows:

$$R = \left\{\frac{\text{space velocity}}{1.7-1}\right\}\left\{\frac{1}{(\text{conc. of } S \text{ in product})^{0.7}} - \frac{1}{(\text{conc. of } S \text{ in feed})^{0.7}}\right\}$$

The relative rate constants are provided in Table 8. The have been normalized against the values for the third weight period for the COMP Catalyst.

TABLE 8

| Catalyst | Activation | Activity Tests Weight Period | |
|---|---|---|---|
| | | HDS Rel. K Value | HDN Rel. K Value |
| COMP | 1) Standard | 1.00 | 1.00 |
| A | 2) Diesel | 0.94 | 0.88 |
| B | 2) Diesel | 1.04 | 0.94 |
| C | 2) Diesel | 0.87 | 0.87 |
| D | 2) Diesel | 0.94 | 1.02 |
| E | 2) Diesel | 1.00 | 1.01 |

As can be seen from the above table the catalysts of this invention show a comparable hydrodenitrification activity (without significant decrease in activity) to a traditional hydrotreating catalyst. Further, catalysts containing unsaturated hydrocarbons show advantage over catalyst with only saturated hydrocarbons with regard to the hydrodenitrification activity.

We claim:

1. A sulfided, or presulfurized catalyst composition prepared by the steps comprising contacting a sulfur-containing catalyst with a substance comprising at least one oxygen-containing hydrocarbon having at least 16 carbon atoms and having an iodine value of greater than 60 to provide a treated sulfur-containing catalyst, then heating the treated sulfur-containing catalyst at a temperature of greater than about 150° C. thereby fixing the sulfur onto the catalyst, and wherein said sulfided, or presulfurized catalyst has a reduced self-heating characteristic when compared to the catalyst which has not been treated.

2. The composition of claim 1 wherein the oxygen-containing hydrocarbon is selected from the group consisting of acids, acid esters, alcohols, ketones, aldehydes and ethers having at least 16 carbon atoms.

3. The composition of claim 1 wherein the oxygen-containing hydrocarbon comprises at least one acid ester having at least 16 carbon atoms.

4. The composition of claim 2 wherein the oxygen-containing hydrocarbon has up to 100 carbon atoms.

5. The composition of claim 4 wherein the oxygen-containing hydrocarbon has from 16 to 80 carbon atoms.

6. The composition of claim 3 wherein the acid ester comprises at least one glyceride fatty acid ester having from 16 to 100 carbon atoms.

7. The composition of claim 3 wherein the acid ester comprises at least one unsaturated fatty acid ester.

8. The composition of claim 7 wherein the unsaturated fatty acid ester is selected from the group consisting of acid esters of palmitoleic, oleic, linoleic, linolenic, eleostearic, ricinoleic, eicosenoic, docosenoic, eicosatetraenoic, eicosapentaenoic, decosapentaenoic, docosahexaenoic and mixtures thereof.

9. The composition of claim 7 wherein the unsaturated fatty acid ester is selected from the group consisting of soybean oil, linseed oil, safflower oil, sunflower oil, corn oil, cottonseed oil, olive oil, tung oil, castor oil, rapeseed oil, tall oil, peanut oil, canbra oil, perilla oil, vegetable residue, marine oil and mixtures thereof.

10. The composition of claim 3 wherein the acid ester comprises at least one saturated fatty acid ester.

11. The composition of claim 10 wherein the saturated fatty acid ester is selected from the group consisting of coconut oil, palm oil, lard, tallow, and mixtures thereof.

12. The composition of claim 1 wherein the catalyst is a catalyst supported on a porous support.

13. The composition of claim 1 wherein the catalyst comprises at least one metal, metal sulfide, or metal oxide of metals selected from the group consisting of Group VIB and Group VIII of the Periodic Table.

14. A method of reducing the self-heating characteristics of a spontaneously combustible catalyst comprising contacting a sulfur-containing catalyst with at least one oxygen-containing hydrocarbon having at least 12 carbon atoms and having an iodine value of greater than 60 at a temperature of at least about 0° C. to provide a treated catalyst, then heating the treated catalyst at a temperature of greater than about 150° C.

15. The method of claim 14 wherein the oxygen-containing hydrocarbon is selected from the group consisting of acids, acid esters, alcohols, ketones, aldehydes and ethers having at least 12 carbon atoms.

16. The method of claim 15 wherein the oxygen-containing hydrocarbon comprises at least one acid ester having at least 12 carbon atoms.

17. The method of claim 15 wherein the oxygen-containing hydrocarbon has from 12 to 100 carbon atoms.

18. The method of claim 11 wherein the oxygen-containing hydrocarbon has from 16 to 80 carbon atoms.

19. The method of claim 16 wherein the acid ester comprises at least one glyceride fatty acid ester having from 16 to 100 carbon atoms.

20. The method of claim 16 wherein the acid ester comprises at least one unsaturated fatty acid ester.

21. The method of claim 20 wherein the unsaturated fatty acid ester is selected from the group consisting of acid esters of palmitoleic, oleic, linoleic, linolenic, eleostearic, ricinoleic, eicosenoic, docosenoic, eicosatetraenoic, eicosapentaenoic, decosapentaenoic, docosahexaenoic and mixtures thereof.

22. The method of claim 20 wherein the unsaturated fatty acid ester is selected from the group consisting of soybean oil, linseed oil, safflower oil, sunflower oil, corn oil, cottonseed oil, olive oil, tung oil, castor oil, rapeseed oil, tall oil, peanut oil, canbra oil, perilla oil, vegetable residue, marine oil and mixtures thereof.

23. The composition of claim 16 wherein the acid ester comprises at least one saturated fatty acid ester.

24. The composition of claim 23 wherein the saturated fatty acid ester is selected from the group consisting of coconut oil, palm oil, lard, tallow, and mixtures thereof.

25. The method of claim 14 wherein the spontaneously combustible catalyst is a presulfurized or a sulfided catalyst.

26. The method of claim 14 wherein the spontaneously combustible catalyst is a catalyst supported on a porous support.

27. The method of claim 14 wherein the spontaneously combustible catalyst comprises at least one metal, metal sulfide, or metal oxide of metals selected from the group consisting of Group VIB and Group VIII of the Periodic Table.

28. The composition of claim 3 wherein the at least one acid ester is a di-, tri- or poly-fatty acid ester having at least 16 carbon atoms.

29. The composition of claim 3 wherein the acid ester is a monoglyceride, diglyceride, triglyceride, or a mixture thereof.

30. The composition of claim 1 wherein the oxygen-containing hydrocarbon is an alcohol.

* * * * *